Sept. 15, 1970    J. Y. HANSEN    3,528,451

LIQUID LEVEL REGULATING DEVICE

Filed Dec. 18, 1967    2 Sheets-Sheet 1

INVENTOR.
JOHN Y. HANSEN

BY

*Philip M. Hinderst*

ATTORNEY

Sept. 15, 1970   J. Y. HANSEN   3,528,451
LIQUID LEVEL REGULATING DEVICE
Filed Dec. 18, 1967   2 Sheets-Sheet 2

INVENTOR.
JOHN Y. HANSEN
BY
*Philip M. Hinderstein*
ATTORNEY ated Sept. 15, 1970

3,528,451
LIQUID LEVEL REGULATING DEVICE
John Y. Hansen, Tustin, Calif. (% Hansen Machine Company, 7551 Park Ave., Garden Grove, Calif. 92641)
Filed Dec. 18, 1967, Ser. No. 691,331
Int. Cl. F16k *31/18*
U.S. Cl. 137—433        9 Claims

ABSTRACT OF THE DISCLOSURE

A valve assembly for metering a continuous flow of liquid into a reservoir to maintain the liquid level therein substantially constant. The valve comprises a housing which is connected to a supply pipe and which is placed in the reservoir. The housing has an orifice therethrough. A hollow, air-filled ball positioned within the housing senses the level of the liquid and controls the rate of flow through the orifice as a function thereof.

BACKGROUND OF THE INVENTION

Field of the invention

The present invention relates to a liquid level regulating device and, more particularly, to a valve assembly for metering a continuous flow of liquid into a tank or other reservoir to maintain the liquid level therein at a predetermined constant level.

Description of the prior art

In many situations, a body of liquid in a tank or other reservoir is subject to constant depletion through use, evaporation or the like. Under such circumstances, it is often desirable to be able to maintain the liquid level in the tank constant by replenishing the liquid at a rate which is substantially equal to the rate of depletion. One notable example of a situation where such operation would be desirable is in the case of a swimming pool where the water therein is constantly subject to evaporation. In fact, in the case of a swimming pool, it is not only desirable, but often necessary to maintain the level of the water therein at a predetermined, substantially constant, level. This is because the primary expedient used to keep the water in a swimming pool clean is to skim the surface thereof continuously since a major portion of the foreign material in a swimming pool collects at the surface. In order to accomplish this objective apparatus is customarily provided to skim a thin film from the surface of the main body of water in the swimming pool and pump this skimmed water through a filtering tank and back to the main body of water. It can therefore be appreciated that for proper operation of the skimming apparatus and the pump associated therewith, a constant supply of water must be supplied to the skimmer. However, since the skimmer operates on a thin film at the surface of the water, and most skimmers remain stationary, this proper operation can only be achieved when the water level remains substantially constant. In addition, the rate with which the water flows into the skimmer should approximate the rate at which the pump can withdraw water. If such condition can be maintained, the pump continuously has a source of water thereby avoiding an air lock. On the other hand, if the water level in the swimming pool becomes too low, the skimmer does not take off an adequate amount of water and cannot operate effectively to remove the foreign material which collects at the surface of the water. In addition, with a reduced rate of flow of water into the skimmer, the water pump may run dry which may substantially damage the pump.

One prior art solution to this problem has been to provide a skimmer which is operative to float on the surface of the water. In this manner, even if the water level does not remain constant, the skimmer continues to operate properly. However, such skimmers are generally quite expensive and, therefore, are not in widespread use. As a result, maintaining the water level substantially constant so that a stationary skimmer may be used is a far more desirable solution to the problem.

The magnitude of the problem of maintaining the water level constant in a swimming pool may be appreciated by considering the fact that over 100 gallons of water may evaporate per day from an average size, heated, backyard swimming pool. On very hot days, this figure may be substantially higher. As a result, if apparatus is not provided for automatically maintaining the water level constant in the swimming pool, water must be manually added on a daily basis if the skimmer and pump are to operate efficiently. As can be imagined, this represents a considerable nuisance. Furthermore, as pointed out above, if water is not added on a daily basis, no cleaning action whatsoever takes place and the pump may be substantially damaged or ruined.

It can therefore be appreciated that a substantial need exists for a device to regulate the level of liquid in tanks such as swimming pools. Most existing devices for performing this function consist of a float operatively connected to a valve whereby the valve is opened to add liquid from an external source in response to a change in liquid level as sensed by the float. In such systems, however, the valve mechanism generally operates in a full open or full closed position such that the system does not start to add water to the pool until the water level reaches a predetermined low level. Water is then added until the water level reaches a predetermined high level. As a result, the water level in the pool is never maintained at a constant level but rather varies between predetermined limits. In addition, most existing systems require a complicated array of pipes, floats and valves which must be installed at the time the swimming pool is constructed. Finally, because of the complicated nature of most systems, the costs of procurement and maintenance are generally quite high.

SUMMARY OF THE INVENTION

According to the present invention there is provided a liquid level regulating device which substantially overcomes the problems mentioned above. The present liquid level regulating device is not only extremely simple in its mechanical construction, adding to its long life and reliability, but can be readily added to existing reservoirs with a minimum or no reconstruction. Due to its simplicity, the present invention may be manufactured and sold very cheaply. In addition, installation costs are extremely low since the present device may be installed with do-it-yourself ¼ inch copper tubing. Finally, the present liquid level regulating device is effective to maintain the level of the liquid in the reservoir substantially constant by metering a continuous flow of liquid thereto at a rate which is directly a function of the rate of loss.

The present invention consists of a valve which is placed in the reservoir and connected to an inlet pipe which, as indicated above, may be copper tubing. In one embodiment, the valve may consist most simply of a housing having a head portion which is internally threaded for receiving the inlet tube and a hollow body portion adapted to receive the float element. The housing has an orifice leading from the internally threaded portion of the head into the hollow section of the body portion. The only other component may, most simply, be a hollow, air-filled ball which operates as both the float and the control mechanism for metering an amount of liquid through the orifice to maintain the liquid level in the reservoir substantially constant. In another embodiment, the valve may consist of a housing having one or more inlet holes and one or more outlet holes connected by a cylinder. A piston, connected to the float element, is positioned to reciprocate within the cylinder to control the rate of flow of liquid from the inlet holes to the outlet holes.

OBJECTS

It is therefore an object of the present invention to provide a novel liquid level regulating device.

It is a further object of the present invention to provide apparatus for regulating the liquid level in a reservoir which apparatus is mechanically simple and may be readily added to existing reservoirs.

It is a still further object of the present invention to provide a device for automatically maintaining the liquid level in a tank.

It is another object of the present invention to provide a float valve for automatically maintaining the liquid level in a reservoir by metering a continuous flow of liquid into the reservoir.

It is still another object of the present invention to provide a float valve in which the float operates as both the liquid level sensor and the valve element.

Another object of the present invention is the provision of a float valve which is operative to meter a continuous flow of liquid over a wide range.

Still other objects, features and attendant advantages of the present invention will become apparent to those skilled in the art from a reading of the following detailed description of several preferred embodiments constructed in accordance therewith, taken in conjunction with the accompanying drawings wherein like numerals designate like parts in the several figures and wherein:

DESCRIPTION OF THE PREFERRED EMBODIMENTS

The present invention will be described in its application to a swimming pool as that is presently thought to be the most useful environment. However, it will be apparent to those skilled in the art that the invention is equally well suited for use in regulating the liquid level in any type of tank or liquid reservoir.

Figure 1:
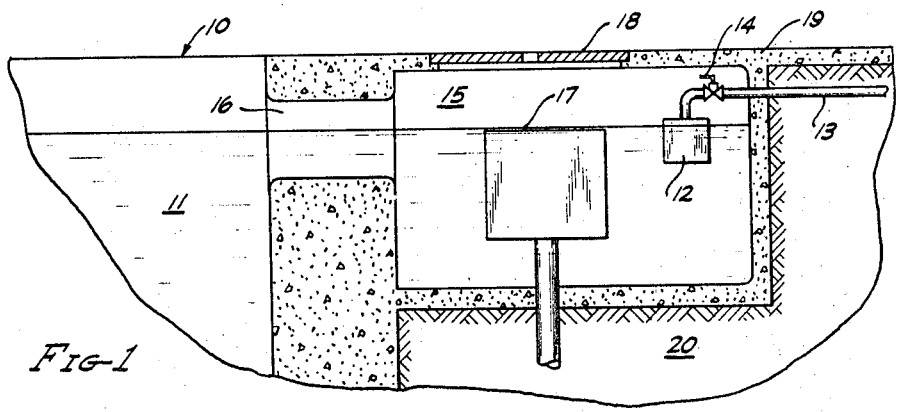
FIG. 1 is a diagramatical cross-sectional view illustrating a swimming pool showing the way the present invention may be incorporated therein.

Referring now to the drawings and, more particularly, to FIG. 1 thereof, there is shown a diagrammatical cross-sectional view of a portion of a swimming pool 10 having a body of water 11 therein and showing the manner in which the present invention may be incorporated in such swimming pool. The present invention consists of a valve, shown diagrammatically as 12 in FIG. 1 connected to a pipe or duct 13, which may be ¼ inch copper tubing, through which water from an external source may flow to valve 12. A petcock 14 may be positioned in pipe 13 to completely shut off or regulate the flow of water to valve 12. Valve 12 is placed in swimming pool 10 at the surface of water 11 and operates to meter fresh water into pool 10 to maintain the water level therein substantially constant. Valve 12 may be located in any convenient place in pool 10 as long as it is properly positioned with respect to the surface of body of water 11. A convenient location for valve 12 is shown in FIG. 1.

Most home swimming pools include a skimmer which is generally located in a small reservoir 15 which is connected to the main body of water by a passageway 16. The skimmer generally consists of a trap 17 through which the water is drawn by a pump (not shown). The water is then subjected to a filtering stage and then pumped back to the main body of water 11. The trap is effective to accumulate a major portion of the dirt which collects at the surface of body of water 11. A cover 18 is generally provided in the decking 19 above trap 17 to provide access thereto so that it may be periodically cleaned.

According to the present invention, valve 12 may be located in reservoir 15 so as to have access to the surface of body of water 11 while not interfering with the swimming area of pool 10. As can be seen from FIG. 1, valve 12 may be installed by running copper tubing 13 from the normal water supply to reservoir 15. Tubing 13 may be run through the ground 20 directly below decking 19, although it will be apparent that pipe 13 may also be run above decking 19.

Figure 2:
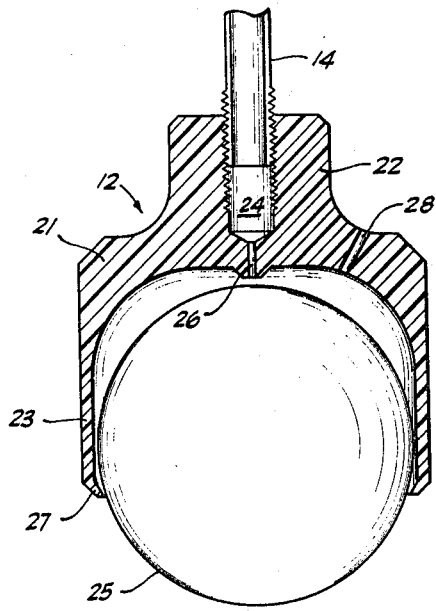
FIG. 2 is a cross-sectional view of a first embodiment of the present invention.

Referring now to FIG. 2, there is shown a cross-sectional view of a first embodiment of a float valve constructed in accordance with the teachings of the present invention. Float valve 12 consists of a housing 21 having a head portion 22 and a body portion 23. Head portion 22 has a bore 24 which is internally threaded to receive the external threads of petcock 14. Body portion 23 is hollowed out to receive a float element 25 which may, most simply, be a hollow ball. Housing 21 is also provided with an orifice 26 extending from bore 24 into the hollow section of body portion 23. Body portion 23 may also be provided with a lip 27 at the end thereof so as to prevent ball 25 from falling out of housing 21. A filter, which may be made of felt or cotton, may conveniently be placed in bore 24 to prevent foreign particles in the water supply from clogging orifice 26.

In operation, valve 12 is located in swimming pool 10 with the center of ball 25 at the desired water level. Ball 25 operates as a float whose vertical position is a function of the water level in pool 10. At the same time, the water in pipe 13 passes through orifice 26 past ball 25 into swimming pool 10. However, if the diameter of orifice 26 is chosen properly, the rate at which water will pass from pipe 13 therethrough will be a function of the vertical position of ball 25. If ball 25 is, for example, a ping pong ball, it will be effective to provide approximately one ounce of pressure due to its buoyancy. Therefore, the diameter of orifice 26 is chosen, based upon the water pressure in pipe 13, so that the downward pressure exerted on ball 25 by the water passing through orifice 26 is also approximately one ounce or equal to the buoyant pressure of ball 25. With normal water pressures, the diameter of orifice 26 may be approximately .020 to .030 inch in diameter and operate properly. In general, the size of orifice 26 must be large enough to provide a sufficient rate of flow to satisfy the needs of pool 10 but small enough that ball 25 can overcome the water pressure at the inlet. This is readily accomplished with the dimensions given above. In a typical situation, a valve such as that shown in FIG. 2 has operated with an inlet pressure of 70 p.s.i. to meter a flow of water into a swimming pool at a rate which varied from almost zero gallons per day to approximately 175 gallons per day.

If, in the configuration shown in FIG. 2, valve 12 is not operative to completely cut off the flow of water through orifice 26, ball 25 may be dipped in a rubber-like material to afford a complete seal of orifice 26. Another approach would be to coat the end of orifice 26 with a soft, rubber-like material to effect the seal. Furthermore, petcock 14 may be used to completely shut off the flow of water.

In the embodiment shown in FIG. 2, it is possible that when ball 25 is operating very close to orifice 26, that it may become locked in position at the upper end of body portion 23 due to the absence of air pressure therein. To prevent this from happening, a hole 28 may be drilled in housing 21 to provide a flow of air from outside of housing 21 into the hollow section of body portion 23 to release ball 25.

Figure 3:
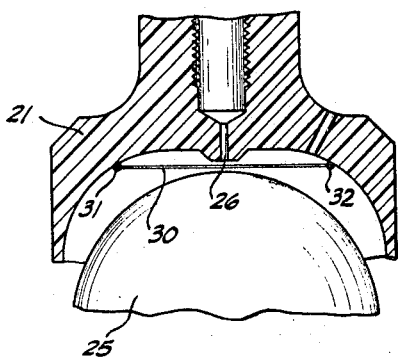
FIG. 3 is an enlarged, partial, cross-sectional view of the valve of FIG. 2 showing a modification that may be made thereto.

Another technique for providing a complete seal of orifice 26 may be seen with reference to FIG. 3 which shows an enlarged view of a portion of the valve of FIG. 2. A thin strip 30 of a resilient material, which may be rubber or plastic, may be cemented to opposite sides 31 and 32 of body portion 23 so that resilient strip 30 passes in front of orifice 26. Such a strip readily permits ball 25 to completely seal orifice 26 when the water level is at the proper level.

It should be readily apparent that many modifications are possible for the valve shown in FIG. 2 depending upon the circumstances in which it will be used. For example, as stated above, a ping pong ball is operative to provide approximately one ounce of pressure. If an additional amount of pressure is desired, many possible modifications may be made. For example, body portion 23 or housing 21 may be extended so that two or more ping pong balls may be stacked vertically therein. Or, instead of using a round ping pong ball, a cylindrical float may be used since a cylindrical float having a diameter and length which are equal to the diameter of a sphere will provide 50% more pressure against orifice 26.

Figure 4:
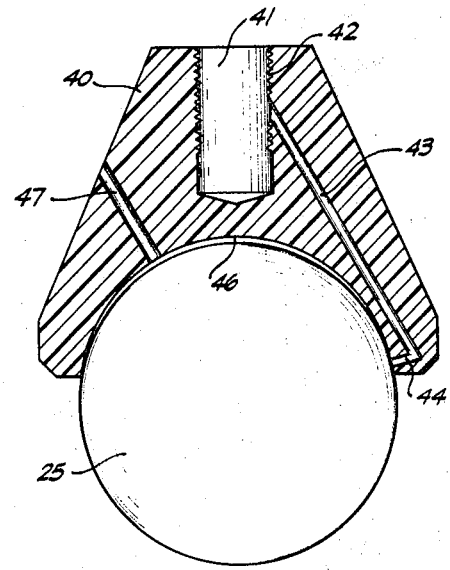
FIG. 4 is a cross-sectional view of a second embodiment of the present invention.
Figure 5:
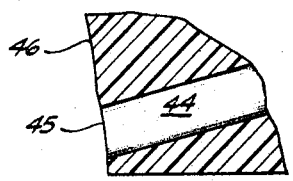
FIG. 5 is an enlarged, partial, cross-sectional view of the valve of FIG. 4 showing the details of the jet.

Referring now to FIG. 4, there is shown another modification which may be made to the valve of FIG. 2 to increase the buoyant effect of ball 25. The valve of FIG. 4 includes a housing 40 having a bore 41 therein which may be internally threaded at 42 to receive the external threads of inlet pipe 13 or petcock 14. The valve of FIG. 4 differs from that of FIG. 2 in that an orifice 43 extends from the side of bore 41 rather than from the bottom thereof so as to provide fluid communication between bore 41 and a second orifice 44 in housing 40 which is positioned in housing 40 at a considerable angle from the central vertical axis. Reference should also be made to FIG. 5 which shows an enlarged view of orifice 44 showing how only the end 45 thereof must be made to mate with ball 25, the remainder 46 of the inner surface of housing 40 being suitably relieved. The valve of FIG. 4 may also be provided with a relief passageway 47, for reasons explained more fully hereinbefore. With a configuration such as that shown in FIG. 4, orifice 44 may be substantially larger in diameter than orifice 26 in the embodiment of FIG. 2 since it is only the vertical component of the water jet exiting from orifice 44 which operates to buck the buoyancy of ball 25. With an orifice which is twice the diameter of orifice 26 in FIG. 2, four times as much water may be metered through the valve, if necessary.

Instead of making the valve of FIG. 4 with a single orifice 44 which is approximately twice as large as orifice 26 of FIG. 2, the valve of FIG. 4 may be modified to include 2 or 3 or more orifices equally spaced around housing 40. With such a modification, the lateral force on ball 25 may be reduced to zero thereby causing better and smoother operation of the valve.

Figure 6:
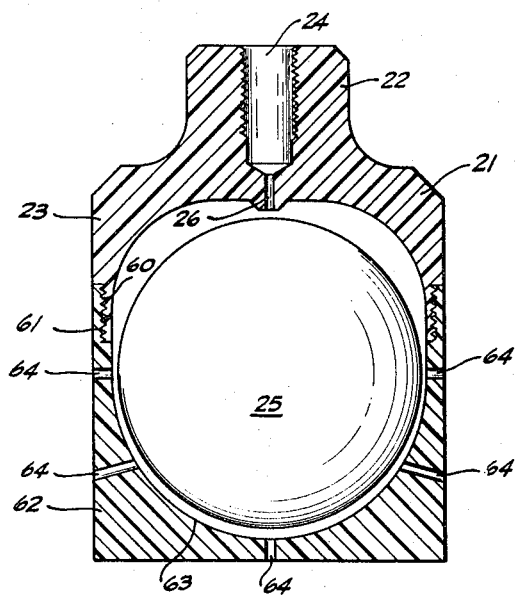
FIG. 6 is a cross-sectional view of a third embodiment of the present invention.

Referring now to FIG. 6, there is shown a further modification of the basic valve of FIG. 2 so as to substantially isolate the operation of the valve from the effects of turbulence and waves. It can be readily appreciated that with a configuration such as that shown in FIG. 2, wherein the bottom of housing 21 is substantially open, ball 25 may be subjected to turbulence and waves in the body of water. If this is a problem, the configuration of FIG. 6 may be used in which body portion 23 is shortened and provided with external threads 60 so as to engage with the internal threads 61 of a cylindrical, hollow enclosure 62 which is adapted to be engaged with housing 21 to enclose ball 25. The upper surface 63 of enclose 62 may be semicircular to provide a seat for ball 25. In addition, enclosure 62 may be provided with a plurality of holes 64 to permit the water passing through orifice 26 to escape into swimming pool 10.

In all of the embodiments discussed theretofore, with a given diameter of orifice, the water level on ball 25 will be a function of the inlet water pressure. In other words, since the upward pressure exerted by ball 25 is a function of the amount that it is submerged, the depth of submergence of ball 25 will vary as the vertical pressure exerted by the water jet varies. This may be undesirable in that variations in water pressure may result in a variation of water level. In addition, it is desirable to always operate ball 25 with the water level at the center thereof since under these circumstances, there will be a maximum change in the buoyant force per unit change in water level. Therefore, it may be desirable to provide ball 25 with means for adjusting the pressure exerted by it so as to maintain the water level at the center of the ball in the presence of changes in inlet water pressure. Such a means may be understood with reference to FIGS. 7 and 8.

Figure 7:
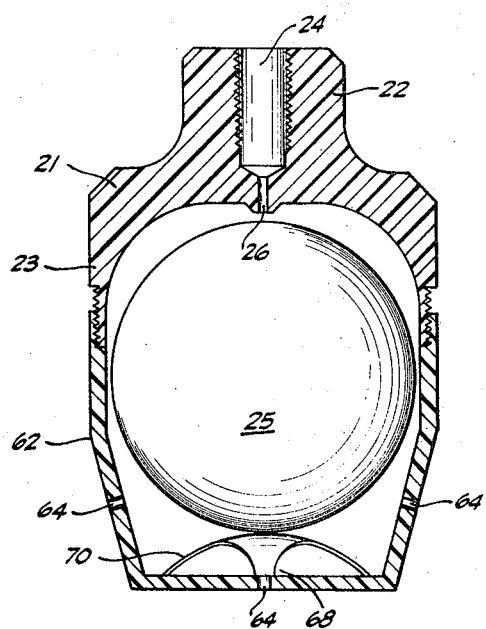
FIG. 7 is a cross-sectional view of a modification of the embodiment of FIG. 6 so as to make the pressure of the float element adjustable.
Figure 8:
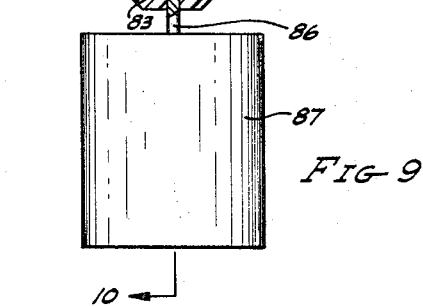
FIG. 8 is a view of a spring element which may be used in the embodiment of FIG. 7.

Referring now to FIG. 7, there is shown a modification of the valve of FIG. 6 in which enclosure 62 is extended at the bottom thereof to provide a space 68 for a spring member 70 which may be a section of a ping pong ball cut in the manner shown in FIG. 8 to form a plurality of arms 71–73. With such a configuration, a small vertical force applied at the center of member 70 flexes arms 71–73 providing a substantial counter force. Therefore, with member 70 inserted in space 68, housing 62 may be rotated so as to adjust the force that member 70 exerts on ball 25 to assist ball 25 in bucking the pressure exerted by the water jet passing through orifice 26. In this manner, by the simple expedient of rotating enclosure 62, the valve may be readily adjusted so that the water level on ball 25 is at the center of the ball.

Figure 9:
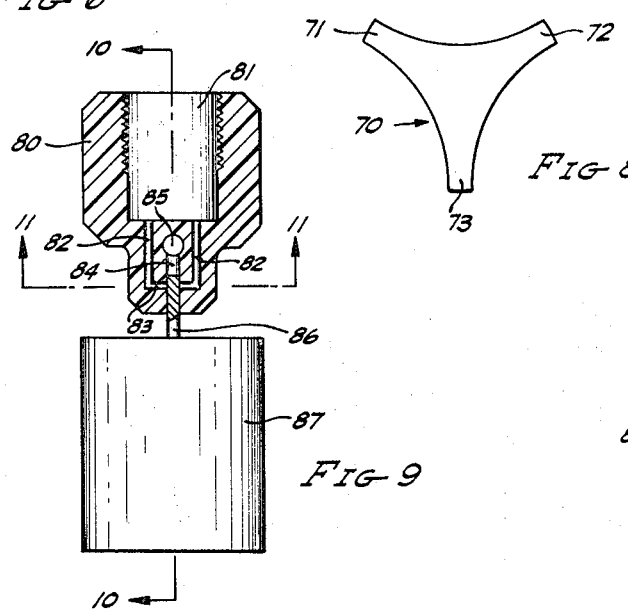
FIG. 9 is a cross-sectional view of a fourth embodiment of the present invention in which the depth of the float is not a function of the inlet line pressure.

Referring now to FIG. 9, there is shown a cross-sectional view of a fourth embodiment of the present invention in which the depth of the float does not vary with changes in inlet line pressure. The valve of FIG. 9 includes a body portion 80 having an internally threaded bore 81 for receiving theo external threads of pipe 13 or petcock 14. Valve body 80 has a plurality of inlet holes 82, two being shown in FIG. 9, which lead from bore 81 to a hole 83 which connects inlet holes 82. Another hole 84 is positioned in body 80, intermediate inlet holes 82, to form a chamber as shown more clearly in FIG. 11 which is an enlarged, partial, cross-sectional view of the valve of FIG. 9 taken along lines 11—11 thereof. Chamber 84 extends from the bottom of body 80, through connecting hole 83, to an outlet hole 85, which extends from one side of body 80 to the other as shown more clearly in FIG. 10 which is a cross-sectional view of the valve of FIG. 9 taken along lines 10—10 thereof. Chamber 84 is adapted to receive a pin 86 connected to a float 87. Pin 86 is operative to freely reciprocate within chamber 84 as a function of the position of float 87.

In operation, the vertical position of float 87 will vary as a function of the water level in the pool. When float 87 is in the position, relative to valve body 80, shown in FIG.

9, pin 86 extends through connecting hole 83 into the upper portion of chamber 84 thereby substantially cutting off the flow of water from inlet holes 82 to outlet hole 85. On the other hand, when float 87 is in the position shown in FIG. 10, pin 86 does not extend into connecting hole 83 and water is free to flow from inlet holes 82 to outlet hole 85 via connecting hole 83 and chamber 84. As float 87 moves from the position shown in FIG. 10 to the position shown in FIG. 9, the head of pin 86 moves into connecting hole 83 thereby varying the rate of flow of water from connecting hole 83 into chamber 84. In other words, the small amount of motion of the head of pin 86 from the bottom of connecting hole 83 to the top thereof is all that is necessary to vary the rate of flow through the valve from full open to full closed.

Figure 11:
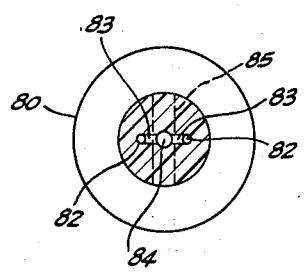
FIG. 11 is an enlarged, partial, cross-sectional view of the embodiment of FIG. 9 taken along lines 11—11 thereof.
Figure 10:
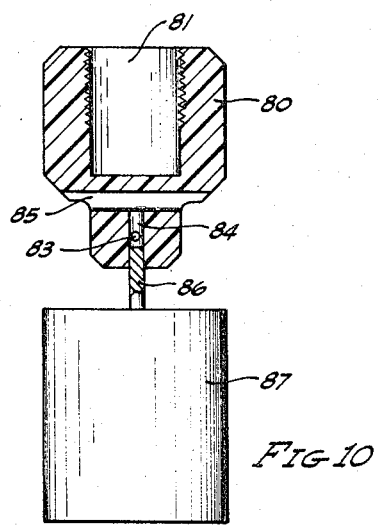
FIG. 10 is a cross-sectional view of the embodiment of FIG. 9 taken along lines 10—10 thereof.

With the configuration shown in FIGS. 9–11 wherein two inlet holes are positioned on opposite sides of chamber 84, the balanced pressre on the sides of pin 86 prevents pin 86 from binding within chamber 84. However, it should be evident that other configuration are possible. For example, another pair of inlet holes could be provided with a connecting hole at 90° to hole 83, with the additional connecting hole at the same or a different height than hole 83. In addition, a filter may be provided in bore 81, if necessary. Finally, a sleeve may be pressed onto valve body 80 to protect the valve and, perhaps, to provide a seat so that pin 86 may not drop from body 80.

It can now be appreciated that in accordance with the present invention there is provided a relatively simple mechanical device which is operative to regulate the water level in a swimming pool or other liquid reservoir by metering liquid to the reservoir at a rate which is proportional to the rate of loss. The present valve consists of only two parts, one being a housing and the other being a combination float and valve member. The housing may be made of any suitable low cost plastic or of stainless steel if necessary. As previously mentioned, in several embodiments, the float element may be a simple ping pong ball. The present valve can be readily added to existing pools and may be readily removed therefrom in order to replace the ping pong ball element or to clean the metering orifice.

While the invention has been described with respect to several embodiments constructed in accordance therewith, it will be apparent to those skilled in the art that various modifications and improvements may be made without departing from the scope and spirit of the invention.

I claim:
1. A valve for regulating the level of liquid in a reservoir comprising:
   a housing having an orifice therein; and
   a valve element for controlling the rate of flow of liquid through said orifice, said valve element comprising:
   a float positioned to sense the level of liquid in said reservoir and to meter a continuously variable flow of liquid into said reservoir at a rate proportional to said sensed level, said float being positioned adjacent said orifice whereby said orifice directs a liquid jet onto said float.

2. A valve according to claim 1 wherein the downward pressure exerted on said float by said liquid jet is approximately equal to the buoyant pressure of said float.

3. A valve according to claim 2 further comprising:
   means for adjusting the buoyant pressure of said float on said liquid jet.

4. A valve according to claim 2 wherein the diameter of said orifice is less than 0.050 inch.

5. A valve according to claim 1 wherein said housing comprises:
   a head portion having a bore therein adapted to be connected to a source of liquid; and
   a hollow body portion, said orifice extending through said housing from said bore to the hollow section of said body portion, said float adapted to be positioned within said hollow body portion at the outlet of said orifice for controlling the rate of flow of liquid through said orifice as a function of sensed liquid level.

6. A valve according to claim 5 further comprising:
   means for adjusting the buoyant pressure of said float on said liquid jet.

7. A valve according to claim 5 wherein said orifice directs said liquid jet onto said float at at least one point displaced from the top thereof.

8. A valve for regulating the level of liquid in a reservoir comprising:
   a housing having an orifice and a bore therein, said bore adapted to be connected to a source of liquid;
   at least one inlet hole extending through said housing from said bore to said orifice;
   at least one outlet hole extending from one side of said housing to a point inside thereof;
   a chamber extending from a side of said housing through said orifice to said outlet hole;
   a pin adapted to reciprocate within said chamber to control the rate of flow from said inlet hole to said outlet hole via said orifice and said chamber; and
   a float operatively connected to said pin to control the position thereof as a function of sensed liquid level.

9. A valve according to claim 8 wherein said at least one inlet hole comprises a pair of inlet holes extending through said housing from said bore to opposite sides of said orifice, and wherein said outlet hole extends through said housing from one side to an opposite side thereof.

References Cited

UNITED STATES PATENTS

| 1,120,707 | 12/1914 | Froehlich | 251—61.1 X |
| 1,163,316 | 12/1915 | Brown | 137—398 X |
| 1,693,676 | 12/1928 | Spinelle | 251—82 |
| 1,695,705 | 12/1928 | Ball et al. | 137—430 |
| 1,789,706 | 1/1931 | Kieselbach | 137—433 X |
| 2,613,994 | 10/1952 | Peters | 137—433 X |
| 2,652,849 | 9/1953 | Ebbs et al. | 251—368 X |
| 2,809,752 | 10/1957 | Leslie. | |
| 2,834,370 | 5/1958 | Nelson | 137—433 |
| 3,180,354 | 4/1965 | Grose | 137—449 X |
| 3,421,547 | 1/1969 | Aslan | 137—539 |

WILLIAM F. O'DEA, Primary Examiner

D. R. MATTHEWS, Assistant Examiner

U.S. Cl. X.R.

137—449, 519.5, 539; 251—368